United States Patent

[11] 3,584,761

| [72] | Inventors | Richard J. Flanigan<br>Longmeadow;<br>Ronald W. Chapin, Wilbraham; Rudolph<br>A. Mattson, Springfield, all of, Mass. |
|---|---|---|
| [21] | Appl. No. | 789,294 |
| [22] | Filed | Jan. 6, 1969 |
| [45] | Patented | June 15, 1971 |
| [73] | Assignee | Universal American Corporation<br>Springfield, Mass. |

[54] WORKPIECE FEEDING APPARATUS WITH RECIPROCABLE SHUTTLE
13 Claims, 6 Drawing Figs.

| [52] | U.S. Cl. | 221/276 |
| [51] | Int. Cl. | B65g 59/00 |
| [50] | Field of Search | 221/276,<br>271, 278, 267 |

[56] References Cited
UNITED STATES PATENTS
2,814,393 11/1957 Buck ............................ 221/267X

*Primary Examiner*—Stanley H. Tollberg
*Attorney*—McCormick, Paulding and Huber

ABSTRACT: A magazine supports a plurality of workpieces in end-toward-end relationship so that the lowermost workpiece can be fed therefrom by a reciprocable shuttle, which shuttle drops the workpieces one after another onto a horizontally reciprocable tray for movement toward the work station of a centerless grinder or the like. A horizontally reciprocable plunger, moved by the same actuator which is used to move the tray, slides the workpiece off the tray to the work station. One embodiment is particularly well suited for headed workpieces, such as rivets.

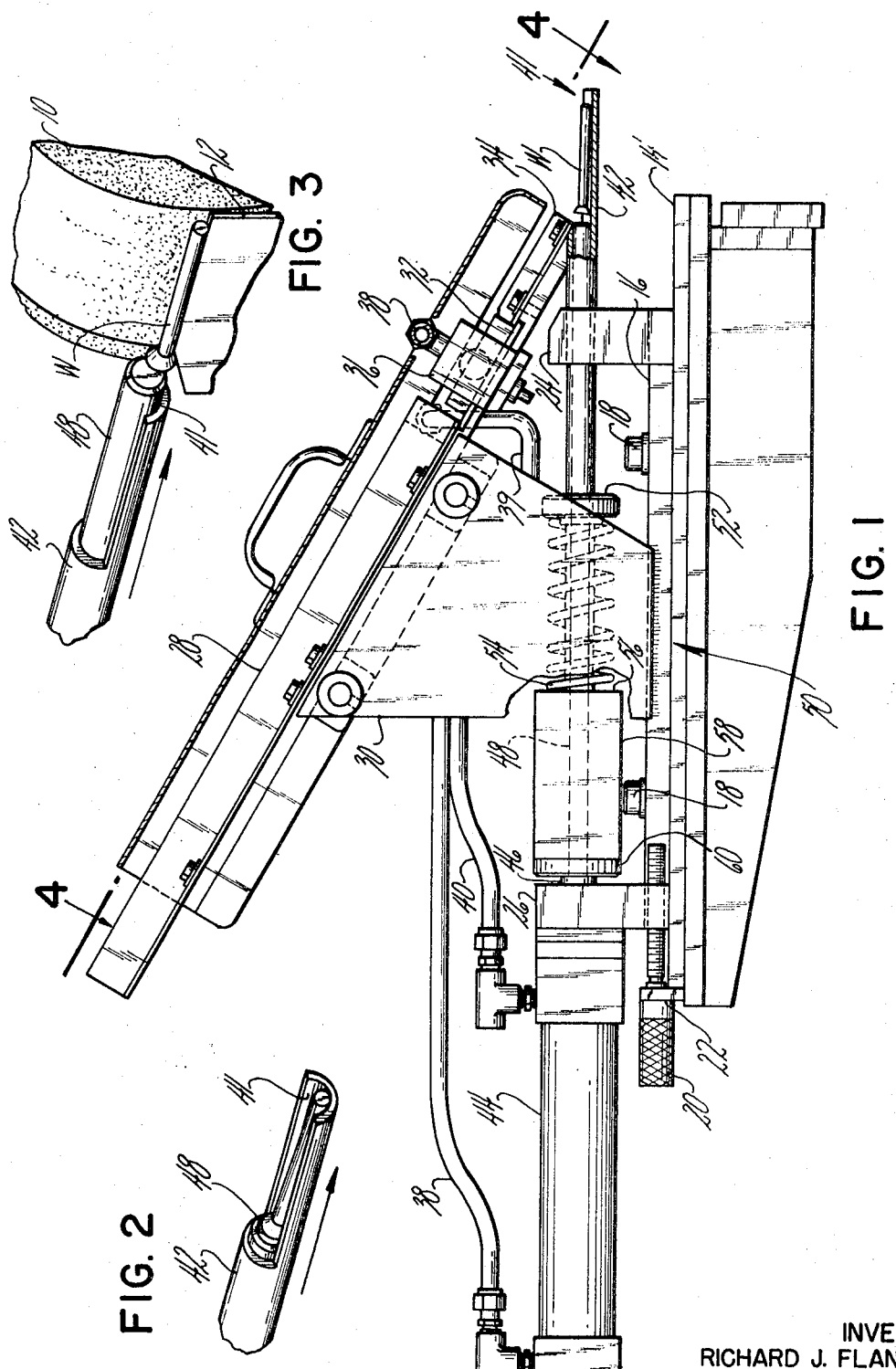

WORKPIECE FEEDING APPARATUS WITH RECIPROCABLE SHUTTLE

SUMMARY OF THE INVENTION

This invention relates to apparatus for feeding workpieces, and deals more particularly with an apparatus for feeding a number of workpieces from the lower end of a gravity type workpiece magazine to the work station of a centerless grinder or the like.

A general object of the present invention is to provide a workpiece feeding apparatus wherein a number of workpieces can be conveniently handled and sequentially fed onto a conventional work rest of the type provided on a centerless grinder.

BRIEF DESCRIPTION OF THE DRAWINGS

FIG. 1 is an elevational view of a workpiece feeding apparatus constructed in accordance with the present invention with portions thereof broken away.

FIG. 2 is a perspective view of one workpiece located in the workpiece feeding portion of the apparatus shown in FIG. 1.

FIG. 3 is a perspective view of the portion of the apparatus shown in FIG. 2 with the workpiece being shown at the work station of a centerless grinder.

DETAILED DESCRIPTION

Figure 4:
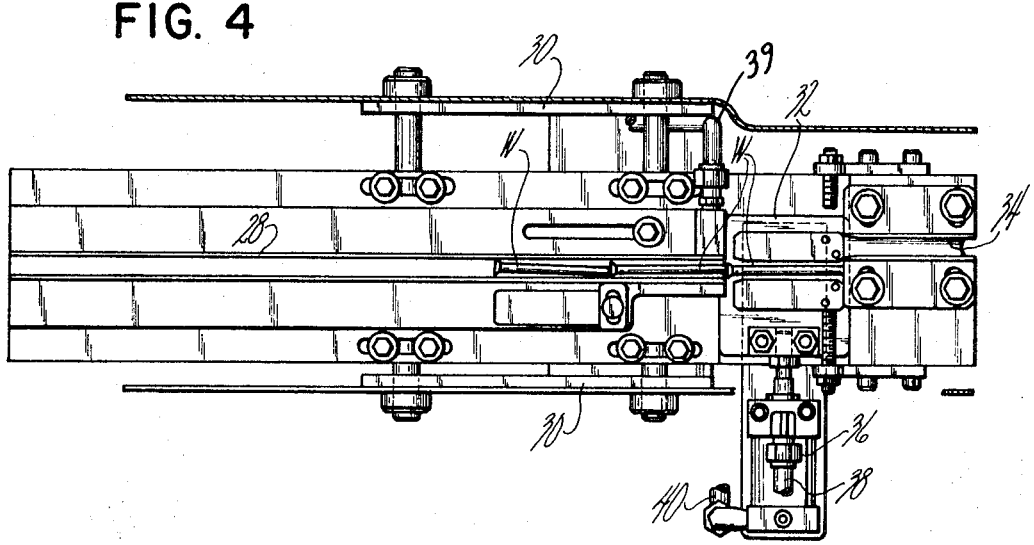
FIG. 4 is a view of the apparatus shown in FIG. 1, being taken on line 4—4 of that view.

Turning now to the drawing in greater detail, FIG. 3 shows, schematically, a work station of a centerless grinder wherein a workpiece W is adapted to be ground as a result of being held against a grinding wheel 10 by a holder wheel (not shown), and while supported on a stationary work rest 12 of conventional construction. FIG. 1 shows a workpiece feeding apparatus constructed in accordance with the present invention for sequentially advancing workpieces, of the type shown at W in FIG. 3, to such a work station. The mechanism of FIG. 1 is mounted on a fixed frame 14 which may comprise a conventional part of the centerless grinder or other workpiece forming machine with which a device of present invention might be associated. The frame 14 preferably includes longitudinally extending ways for slidably supporting an elongated plate 16 and to which the plate can be adjustably clamped, as for example by the bolts, 18, 18. Means is provided for adjusting the plate 16 longitudinally with respect to the fixed frame 14, and as shown in FIG. 1 said means may comprise a lead screw 20 which is threadably received in the plate 16, and rotatably received in a fixed bearing 22 on the frame 14.

Longitudinally spaced uprights 24 and 26 are provided on the plate 16 for supporting movable means, to be described, capable of receiving a workpiece after it has been released from a magazine, which magazine will now be described in detail.

The magazine shown in FIGS. 1 and 4 comprises an inclined chute 28 in which a plurality of elongated workpieces are arranged in end-toward-end relationship one above the other so as to be gravity fed from left to right as viewed in FIG. 1. The chute 28 comprises a generally U-shaped magazine which is supported in fixed relationship to the plate 16 on a pair of laterally spaced members 30, 30.

A reciprocable shuttle 32 is provided adjacent the lower end of the magazine 28 for retaining the lowermost workpiece in the chute when said shuttle is in a first position (not shown) and for releasing the workpiece when said shuttle is moved to a second position, best shown in FIG. 4, so that the workpiece is free to slide down an inclined chute 34 for delivery to movable means to be described. The shuttle 32 is reciprocated between the first and second positions just described by an air-operated actuator 36 of conventional construction, having air lines 38 and 40 for operation of its internal piston (not shown) in timed relationship with operation of the movable means for receiving and advancing the workpiece from the position indicated generally at W in FIG. 1 to the work rest 12 as shown in FIG. 3. In order to assure that the single workpiece in the chute 34 does slide downwardly with sufficient speed an air line 39 provides a jet of high pressure air along the chute 34 to insure that the workpiece is positively moved down the chute.

Turning now to a more complete description of the means for receiving the released workpiece as it drops from the chute 34 adjacent the shuttle 32, said movable means preferably comprises an upwardly open receptacle or trough 41 for receiving the released workpiece. The receptacle 41 is defined adjacent the open end of a tubular member 42 slidably supported in the fixed block 24. A fluid actuator 44 is mounted to the other fixed block 26, and has an internal piston (not shown) which is driven in timed relationship with the shuttle piston by the air lines 38 and 40. The fluid actuator 44 has an actuating rod 46 one end of which is connected to the piston and the other end of which is connected to a plunger 48, slidably received in the tubular member 42 for engaging the workpiece in the receptacle 41 to urge the workpiece out of the receptacle toward the work station as best shown in FIGS. 2 and 3.

In accordance with the present invention means is provided for interconnecting the plunger 48 and tubular member 42 for achieving the lost motion required to give the plunger 48 a greater stroke than the stroke of the tubular member 42. More particularly, the mechanism 50 is adapted to move the plunger 48 between the retracted position shown in FIG. 2 wherein the workpiece can be received in the receptacle 41 and a further extended position wherein the workpiece is urged from the receptacle as shown in FIG. 3. The tubular member 42 moves with the plunger 48 during an initial portion of its forward movement toward the work station, and likewise, during a corresponding terminal portion of its return movement both the plunger 48 and tubular member 42 move together to allow room for an ejector (not shown) to eject the workpiece from off the work rest blade. After this initial forward portion of movement, the tubular member is stopped by engagement between a movable stop 52 on the tubular member and the rear face of the upright 24, which defines a fixed stop. A return spring 54 acts between the opposite side of the movable stop 52 and an abutment surface 56 on a feeder housing 58, which housing is connected to the plunger 48 by a flanged member 60 carried by the actuating rod 46 of the fluid actuator. The feeder housing 58 comprises a slide block which is adapted to move on fixed ways (best shown in FIG. 5 with reference to an alternative embodiment) and the actuating rod 46 is connected directly to the plunger 48 by the adapter 60 as also shown in detail in FIG. 5.

Figure 5:
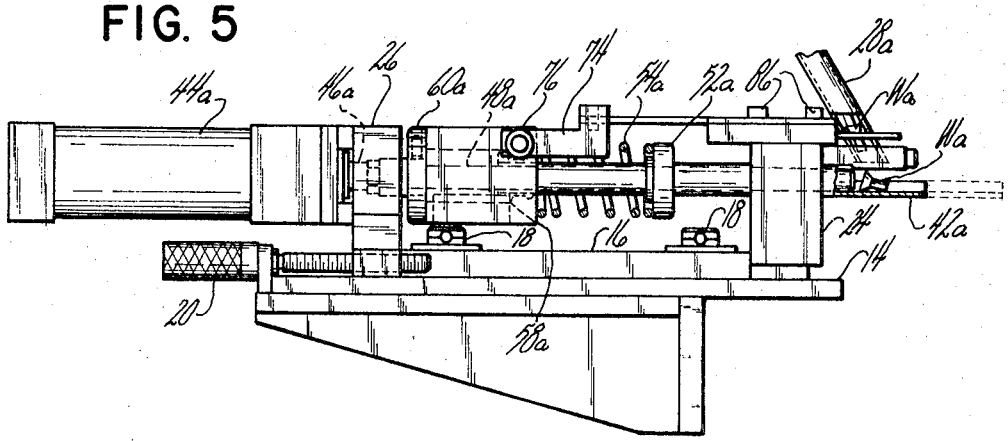
FIG. 5 is an elevational view of an alternative embodiment of the present invention with portions broken away to reveal internal parts.
Figure 6:
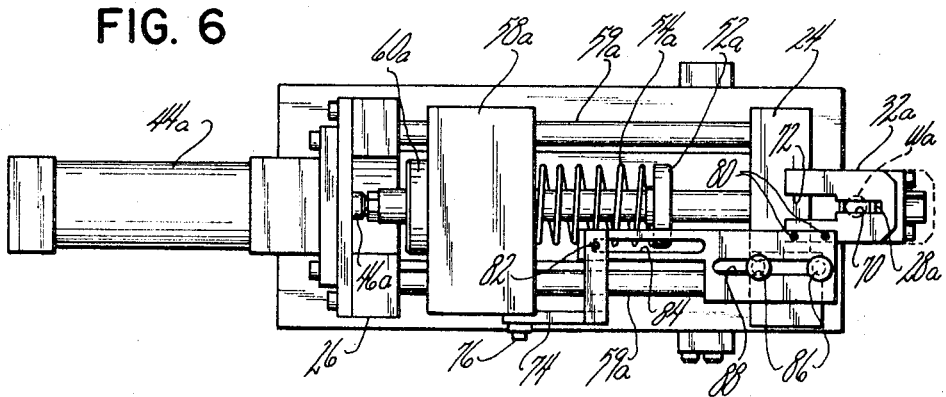
FIG. 6 is a plan view of the apparatus shown in FIG. 5.

Turning now to the construction of the alternative embodiment shown in FIGS. 5 and 6, a fixed table 14 is mounted on the frame and has upstanding support blocks 24 and 26 on the ends of a slidable plate 16 supported on longitudinally extended ways in the table and clamped thereto by bolts, 18, 18. As in the previous embodiment, a lead screw 20 is provided for prepositioning the device mounted to the support blocks 24 and 26 either toward or away from a work station (not shown).

In place of the inclined chute-type magazine 28 shown in the previous embodiment, an inclined tube 28a is provided and may be mounted to the plate 16 in a manner similar to that described hereinabove with reference to said previous embodiment. A fluid actuator 44a is mounted to the rear block 26 and includes an actuating rod 46a *having an adapter 60a* for connecting the actuating rod 46a to a plunger 48a, which plunger is slidably received in the tubular member 42a. As in the previously described embodiment means is provided for interconnecting the tubular member 42a to the plunger 48a, and preferably said means comprises a feeder block or housing 58a slidably received on guide rods 59a, 59a. A compression spring 54a acts between a movable stop 52a provided on the tubular member 42a and the forward end of the feeder block 58a to urge the plunger 48a and tubular member 42a to their retracted positions shown. Forward movement of the actuating rod 46a by the fluid motor 44a serves to move both the plunger 48a and the tubular member 42a forwardly, or to the right in FIGS. 5 and 6, so that workpieces Wa, Wa can be successively received in the upwardly open receptacle 41a defining forward end portion of the tubular member for movement from the solid line position shown in FIG. 5 to the broken line position.

When the movable stop 52a on the tubular member engages the rear face of the fixed support block 24, further forward movement of the tubular member is prevented and the plunger 48a continues to move until an internal stop defined in the feeder block 58a engages the rear end of the tubular member whereby the workpiece Wa can be slid axially from the receptacle to a workstation as indicated schematically in FIG. 3 with reference to the previously described embodiment.

The embodiment shown in FIGS. 5 and 6 is particularly well suited to the feeding of headed elongated workpieces, and incorporates a novel shuttle for withdrawing the lowermost workpiece from the chute 28a and allowing such workpiece to enter the receptacle defined at the forward end of the tubular member 42a. As best shown in FIG. 6, said shuttle comprises a shuttle plate 32a movable from the position shown, wherein the lowermost workpiece in the chute 28a is adapted to hang downwardly with its shank portion extending through an elongated slot 70 provided for this purpose in the plate 32a. As so oriented the workpiece is supported from its headed end portion as best shown in FIG. 5. An enlarged portion 72 of the slot is adapted to pass the headed portion on the workpiece when the shuttle plate is moved to a second position, indicated generally in broken lines in FIG. 6. In this second position the headed workpiece wa drops downwardly into the receptacle 41a defined at the forward end of the tubular member 42a.

In further accordance with the embodiment of the invention shown in FIGS. 5 and 6 means is provided for moving the shuttle plate 32a between its first and its second position in timed relationship with movement of the plunger 48a *and tubular receptacle defining member 42a* as described above. Preferably, said means for moving the shuttle plate 32a comprises a lost motion linkage between the shuttle plate and the means for interconnecting the tubular member 42a with the plunger 48a. As best shown in FIG. 6, said lost motion linkage comprises an L-shaped bracket 74 attached to the feeder slide block 58a by a screw 76, and a slotted plate 78 attached to the shuttle plate 32a by screws 80, 80. The L-shaped member 74 includes a pin 82, which pin is slidably received in a slot 84 in the plate 78. The slot 84 provides for a portion of the lost motion and permits the plunger and receptacle defining tubular member to complete at least the initial portion of their travel before a succeeding workpiece Wa is allowed to drop from the chute 28a. The plate 78 is slidably supported on the fixed support block 24 by means of pins 86, 86 in the block 24. An elongated slot 88 in the slotted plate 78 slidably receives the pins 86, 86 for this purpose as so constructed and arranged, the slot 88 defines the limits of travel of the shuttle plate 32a between its first and its second positions.

The shuttle plate 32a thus remains in the position shown in solid lines in FIG. 6, wherein the lowermost workpiece Wa is supported from its upper headed portion in a dangling position as shown in FIG. 5, until a preceding workpiece Wa in the receptacle is advanced to the position shown in broken lines in FIG. 5. As the plunger 48a moves the workpiece from the receptacle to the work station, as depicted in FIGS. 2 and 3 with reference to the previous embodiment, the lowermost workpiece in the chute 28a will be released so as to drop downwardly and be received in the receptacle 41a when the plunger and tubular member are returned to the position shown in solid lines in FIG. 5. Thus, the shuttle plate 32a is located in its second position, wherein the enlarged portion 72 of the slot is provided below the chute, during only a fractional portion of the movement of the plunger with the result that only one workpiece is released at a time.

We claim:

1. A device for advancing elongated workpieces to a work station comprising an upwardly extending magazine for storing a plurality of workpieces in end-toward-end relationship one above the other, a reciprocable shuttle adjacent the lower end of said magazine for retaining the lowermost workpiece in said magazine when in a first position and for releasing that workpiece when moved to a second position, movable means including an upwardly open receptacle for receiving the released workpiece and moving it toward the work station in timed relationship with reciprocable movement of said shuttle, said last-mentioned means also including a fluid operated reciprocatory plunger for engaging the workpiece in said receptacle and urging the said workpiece out of said receptacle toward the work station, said movable means further including a fluid-operated device having a piston for moving said plunger between a retracted position wherein the workpiece can be received in said receptacle and a fully extended position wherein the workpiece is urged from the receptacle, said receptacle defining means comprising a generally tubular member slidably received on said plunger and having an end portion which is upwardly open so as to receive a workpiece therein when said plunger is retracted.

2. A device as defined in claim 1 wherein said movable means further includes means for interconnecting said tubular member with said plunger for movement therewith during an initial portion of its movement toward the work station and during a corresponding terminal portion of its return movement.

3. A device for advancing elongated workpieces to a work station comprising an upwardly extending magazine for storing a plurality of workpieces in end-toward-end relationship one above the other, a reciprocable shuttle adjacent the lower end of said magazine for retaining the lowermost workpiece in said magazine when in a first position and for releasing that workpiece when moved to a second position, movable means including an upwardly open receptacle for receiving the released workpiece and moving it toward the work station in timed relationship with reciprocable movement of said shuttle, said last-mentioned means also including a fluid-operated reciprocatory plunger for engaging the workpiece in said receptacle and urging the said workpiece out of said receptacle toward the work station, wherein said shuttle comprises a shuttle member having an opening for receiving the lowermost workpiece, and means for moving said member generally transversely with respect to said magazine to said second position, chute means for guiding the workpiece released at said second shuttle position toward said receptacle.

4. A device for advancing elongated workpieces to a work station comprising an upwardly extending magazine for storing a plurality of workpieces in end-toward-end relationship one above the other, a reciprocable shuttle adjacent the lower end of said magazine for retaining the lowermost workpiece in said magazine when in a first position and for releasing that workpiece when moved to a second position, movable means including an upwardly open receptacle for receiving the released workpiece and moving it toward the work station in timed relationship with reciprocable movement of said shuttle, said last-mentioned means also including a fluid-operated reciprocatory plunger for engaging the workpiece in said receptacle and urging the said workpiece out of said receptacle toward the work station, wherein said shuttle comprises a shuttle plate having a elongated slot through one end portion of which slot a lower portion of the lowermost workpiece is received to support that workpiece from its upper head portion when said shuttle plate is in its first position, and means for moving said plate in the direction of said slot generally transversely with respect to said magazine so that the headed portion of the lowermost workpiece is free to drop through an enlarged end portion of said slot in said second shuttle plate position.

5. A device as defined in claim 4 wherein said means for moving said shuttle plate comprises a lost motion linkage between said plate and said means for interconnecting said tubular member for moving said shuttle plate from its first to its second position during only a fractional portion of the movement of said plunger.

6. A device as defined in claim 2 wherein said plunger interconnecting means for said tubular member comprises a fixed stop which slidably receives said tubular member intermediate its end portions, a movable stop carried by said tubular member for engaging said fixed stop during movement of said plunger toward the work station for preventing further movement of said tubular member, said fluid operated device having an actuating rod attached to said piston and arranged in alignment with said plunger, and adapter means connecting said actuating rod to said plunger.

7. A device as defined in claim 6 wherein said means connecting said actuating rod to said plunger comprises a feeder slide block, fixed ways for slidably supporting said block, biasing means for urging said block away from said stop on said tubular member, and said feeder block having an abutment surface for engaging a complementary surface on said tubular member to limit the movement of said plunger toward said work station.

8. A device as defined in claim 7 for advancing elongated headed workpieces wherein said shuttle comprises a shuttle plate having an elongated slot through one end portion of which slot a lower portion of the lowermost workpiece is received to support that workpiece from its upper head portion when said shuttle plate is in its first position, and means for moving said plate in the direction of said slot generally transversely with respect to said magazine so that the headed portion of the lowermost workpiece is free to drop through an enlarged end portion of said slot in said second shuttle plate position.

9. A device as defined in claim 8 wherein said means for moving said shuttle plate comprises a lost motion linkage including means carried by said block and by said shuttle plate for moving said plate from its first to its second position during only a fractional portion of the movement of said plunger.

10. A device as defined in claim 1 wherein said shuttle comprises a shuttle member having an opening for receiving the lowermost workpiece, and means for moving said member generally transversely with respect to said magazine to said second position, chute means for guiding the workpiece released at said second shuttle position toward said receptacle.

11. A device as defined in claim 2 wherein said shuttle comprises a shuttle member having an opening for receiving the lowermost workpiece, and means for moving said member generally transversely with respect to said magazine to said second position, chute means for guiding the workpiece released at said second shuttle position toward said receptacle.

12. A device as defined in claim 1 for advancing elongated headed workpieces wherein said shuttle comprises a shuttle plate having an elongated slot through one end portion of which slot a lower portion of the lowermost workpiece is received to support that workpiece from its upper head portion when said shuttle plate is in its first position, and means for moving said plate in the direction of said slot generally transversely with respect to said magazine so that the headed portion of the lowermost workpiece is free to drop through an enlarged end portion of said slot in said second shuttle plate position.

13. A device as defined in claim 2 for advancing elongated headed workpieces wherein said shuttle comprises a shuttle plate having an elongated slot through one end portion of which slot a lower portion of the lowermost workpiece is received to support that workpiece from its upper head portion when said shuttle plate is in its first position, and means for moving said plate in the direction of said slot generally transversely with respect to said magazine so that the headed portion of the lowermost workpiece is free to drop through an enlarged end portion of said slot in said second shuttle plate position.